United States Patent [19]

Dulong et al.

[11] Patent Number: 4,974,155
[45] Date of Patent: Nov. 27, 1990

[54] VARIABLE DELAY BRANCH SYSTEM

[75] Inventors: Carole Dulong; Jean-Yves Leclerc, both of Los Altos; Patrick Scaglia, Saratoga, all of Calif.

[73] Assignee: Evans & Sutherland Computer Corp., Salt Lake City, Utah

[21] Appl. No.: 231,928

[22] Filed: Aug. 15, 1988

[51] Int. Cl.[5] .............................................. G06F 9/42
[52] U.S. Cl. ................................ 364/200; 364/231.8; 364/261.5
[58] Field of Search ......................... 364/200 MS File

[56] References Cited

U.S. PATENT DOCUMENTS

| | | | |
|---|---|---|---|
| 4,338,661 | 7/1982 | Tredennick et al. | 364/200 |
| 4,435,756 | 3/1984 | Potash | 364/200 |
| 4,471,433 | 9/1984 | Matsumoto et al. | 364/200 |
| 4,498,136 | 2/1985 | Sproul, III | 364/200 |
| 4,546,431 | 10/1985 | Horvath | 364/200 |
| 4,656,578 | 4/1987 | Chilinski et al. | 364/200 |

Primary Examiner—Thomas M. Heckler
Attorney, Agent, or Firm—Nilsson, Robbins, Dalgarn, Berliner, Carson & Wurst

[57] ABSTRACT

In a pipeline computer, current instructions executed in sequence are monitored for conditional and unconditional branch commands, as well as the readiness of condition codes, the meeting of branch conditions and split commands. A branch command initiates an interval of delay which affords prefetching target instructions while using pipeline contents to prevent a pipeline break and avoid lost time. Detection of a branch command actuates a register to store a sequence of target instructions. Unless a branch command is conditional, subsequent detection (delayed) of a split command shifts the stored target instructions into operation as the current instructions. For a conditional branch command, a jump or split to the target instructions is performed only if the condition is met. Otherwise the current instruction sequence is restored pending another branch command. Dual instruction registers, program counters and address registers alternate to accommodate branch jumps with considerable time savings by effective programming.

16 Claims, 3 Drawing Sheets

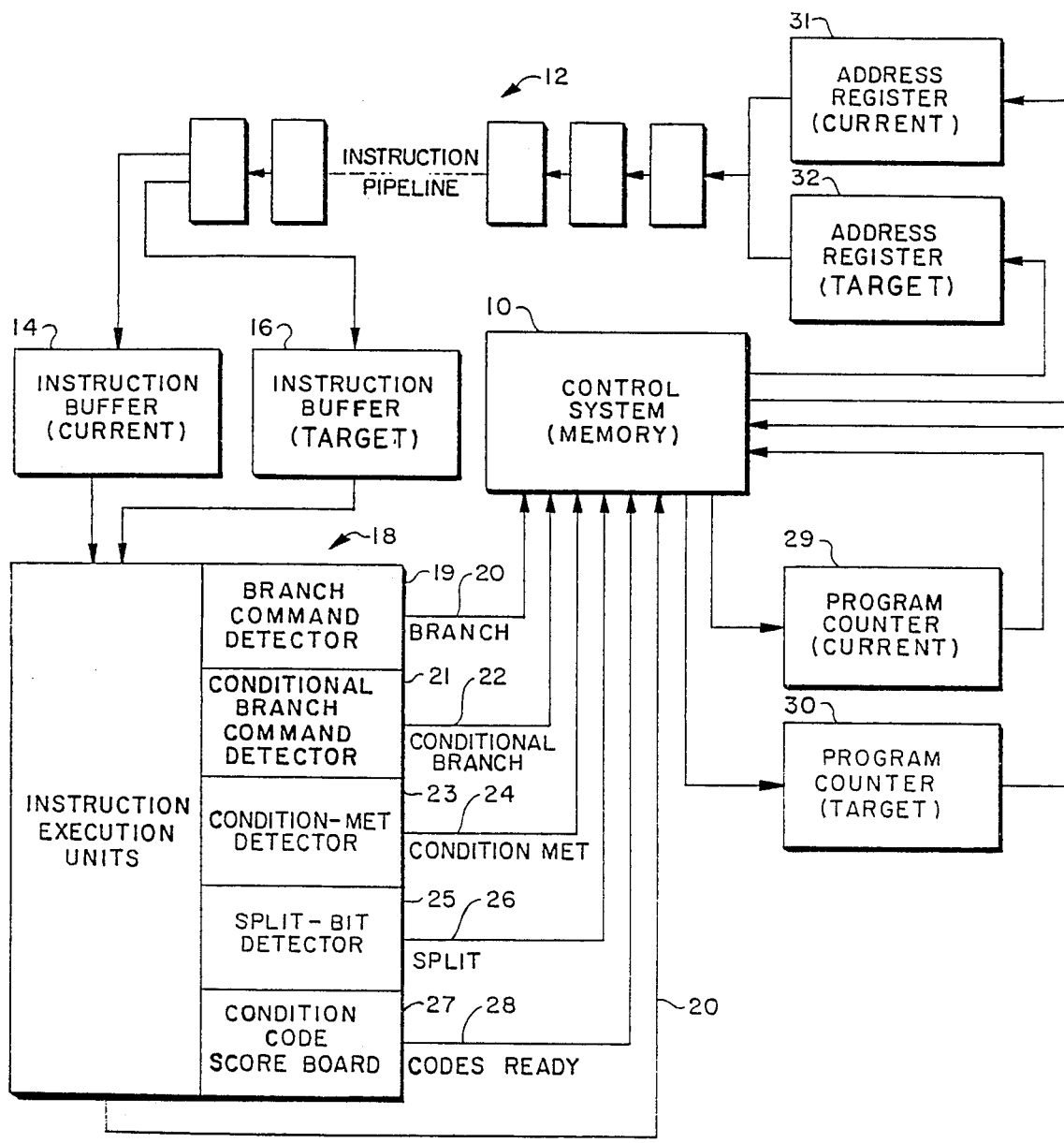
FIG. — 1
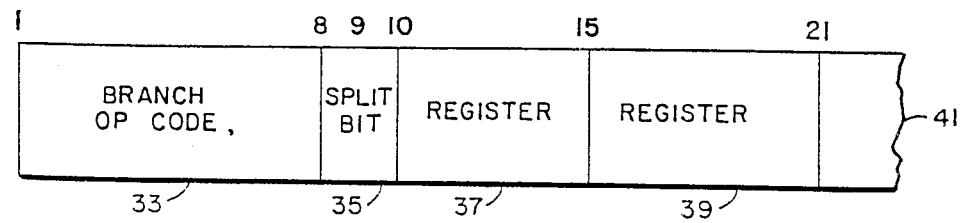
FIG. — 2

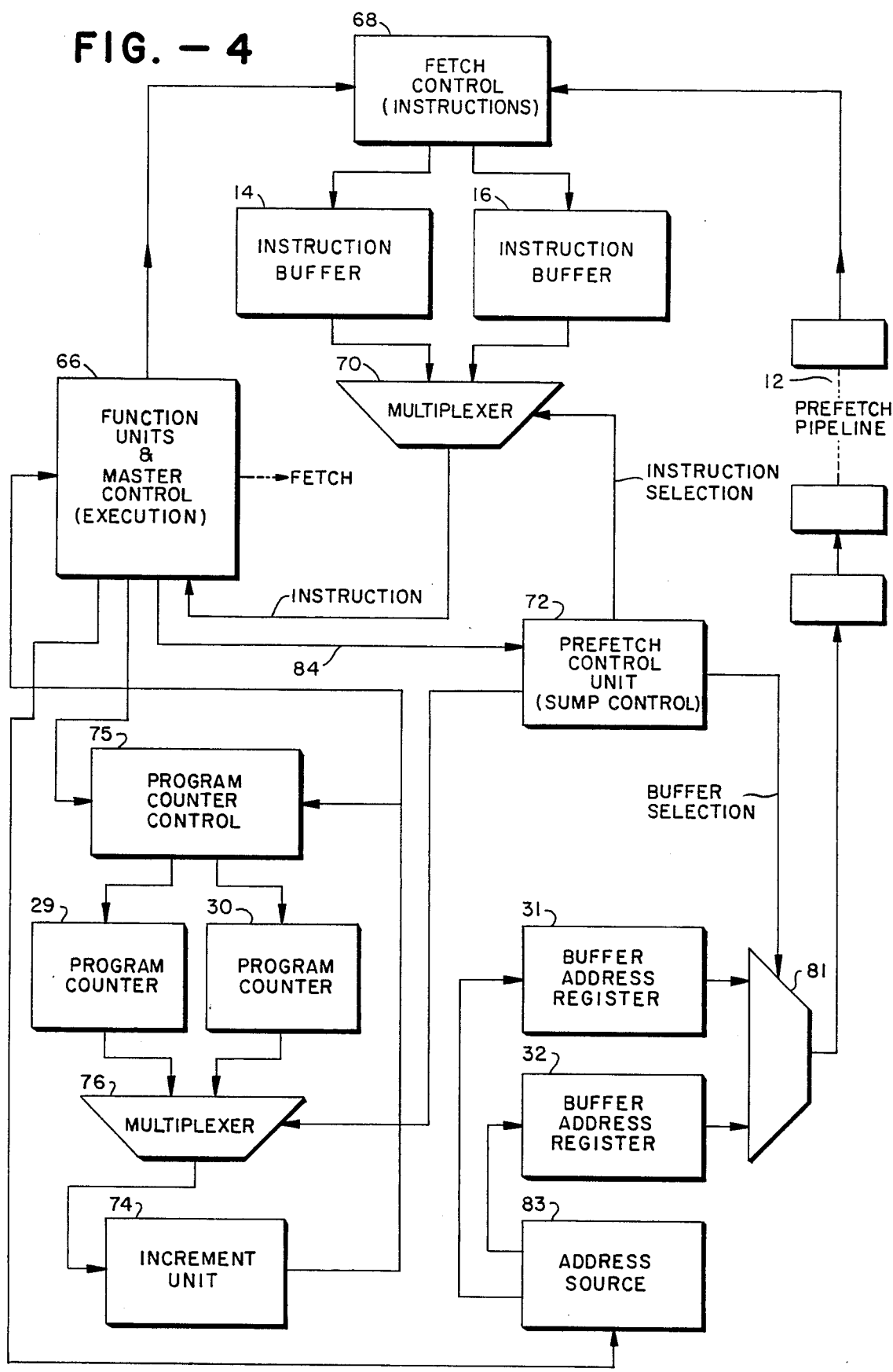
FIG. — 4

VARIABLE DELAY BRANCH SYSTEM

BACKGROUND AND SUMMARY OF THE INVENTION

Pipeline computers bear the name by reason of some similarity to petroleum pipelines that pass different products in sequence through interconnected sections. Before one petroleum product clears a pipeline, several others may have been introduced. By analogy, in pipeline computers, a series of stages perform distinct steps on sequences of passing data.

To consider an exemplary sequence in a pipeline computer: an initial stage fetches instructions, a second stage decodes the instructions, a third stage locates operands and so on. For continuity in existing systems, the final stage in the pipeline may update a program counter to provide the address of the next instruction in a current sequence.

Normally, the first stage of a pipeline computer operates with a program counter value that is several cycles ahead of the counter value produced by the last stage. In one typical operation, the future value of the program counter is estimated for the initial stage on the basis of successive increments. A branch operation commanded by a branch instruction breaks the pipeline normally requiring the program counter to split from an existing sequence. Thus, interaction between the first and last stages of a pipeline computer is effected when a branch command alters the program counter nonsequentially. That is to say, during as many cycles as there are stages in the pipeline, no instructions can be issued. The process is thus blocked with a resulting loss of time. Also, branch operations may involve further complications and loss of time in view of conditions that remain undetermined when a conditional branch instruction reaches the last stage of the pipeline.

With regard to the present system, the delayed branch affords a way to prevent the usual loss of time attendant pipeline breaks and to enable use of what is already in the pipeline. It significantly improves the performance of branch instructions, the occurrence of which are very common (typically more than fourteen percent). Time losses, traditionally attendant pipeline breaks, are avoided by accommodating effective programming of the system.

In general, the present invention involves a system (apparatus and process) involving variable delay branch operation which accommodates programming of both conditional and unconditional branch operations as for use in a pipeline computer to avoid the loss of time.

As programmed instructions are provided for execution, the system implements steps to accommodate a branch command, followed by a split command to indicate the time for the jump. In the disclosed embodiment, the split command comprises a bit in an instruction to command the execution of a branch. That is, a jump is not executed immediately after a branch command but rather is delayed by a variable number of program instructions pending a split command in the form of a split bit. The variable number is under the control of the programmer, enabling considerable flexibility and time saving. However, as disclosed herein, the delay must be at least one cycle. The branch command does not indicate the imposed delay, but rather the system affords flexibility. If no delay is desired, the branch command can be followed by a no-operation instruction containing a split bit.

When a control instruction specifies a conditional branch, the results of subsequent processing are tested until the condition codes are ready and a split bit occurs (in either order). If the condition is not met, the system does not jump but rather resumes execution of the current sequence in the program counter.

In summary, following a branch command, the system affords a variable delay during which branch or target instructions are fetched enabling a prompt jump as on the occurrence of a split bit. By setting up the sequence of target instructions for a branch command, accommodating variable delay and accommodating conditional branches, the system of the present invention enables a substantial saving of time and flexibility in the operation of a pipeline computer. As explained in detail below, the saving of time results because with a branch, the currently operating units continue to function while the target instructions are fetched and loaded. Also, in the case of a conditional branch, condition codes are developed concurrently with useful operation. Of course, the effectiveness of the system is somewhat dependent on the extent of its utilization by an instant operating program.

BRIEF DESCRIPTION OF THE DRAWINGS

In the drawings, which constitute a part of this specification, exemplary embodiments exhibiting various objectives and features hereof are set forth. Specifically:

FIG. 1 is a block diagram of a system in accordance with the present invention;

FIG. 2 is a graphic representation of a fragment of a word format as employed in the system of FIG. 1;

FIG. 4 is a more detailed block diagram of part of the system of FIG. 1 in a different aspect.

DESCRIPTION OF THE ILLUSTRATIVE EMBODIMENT

Figure 3:
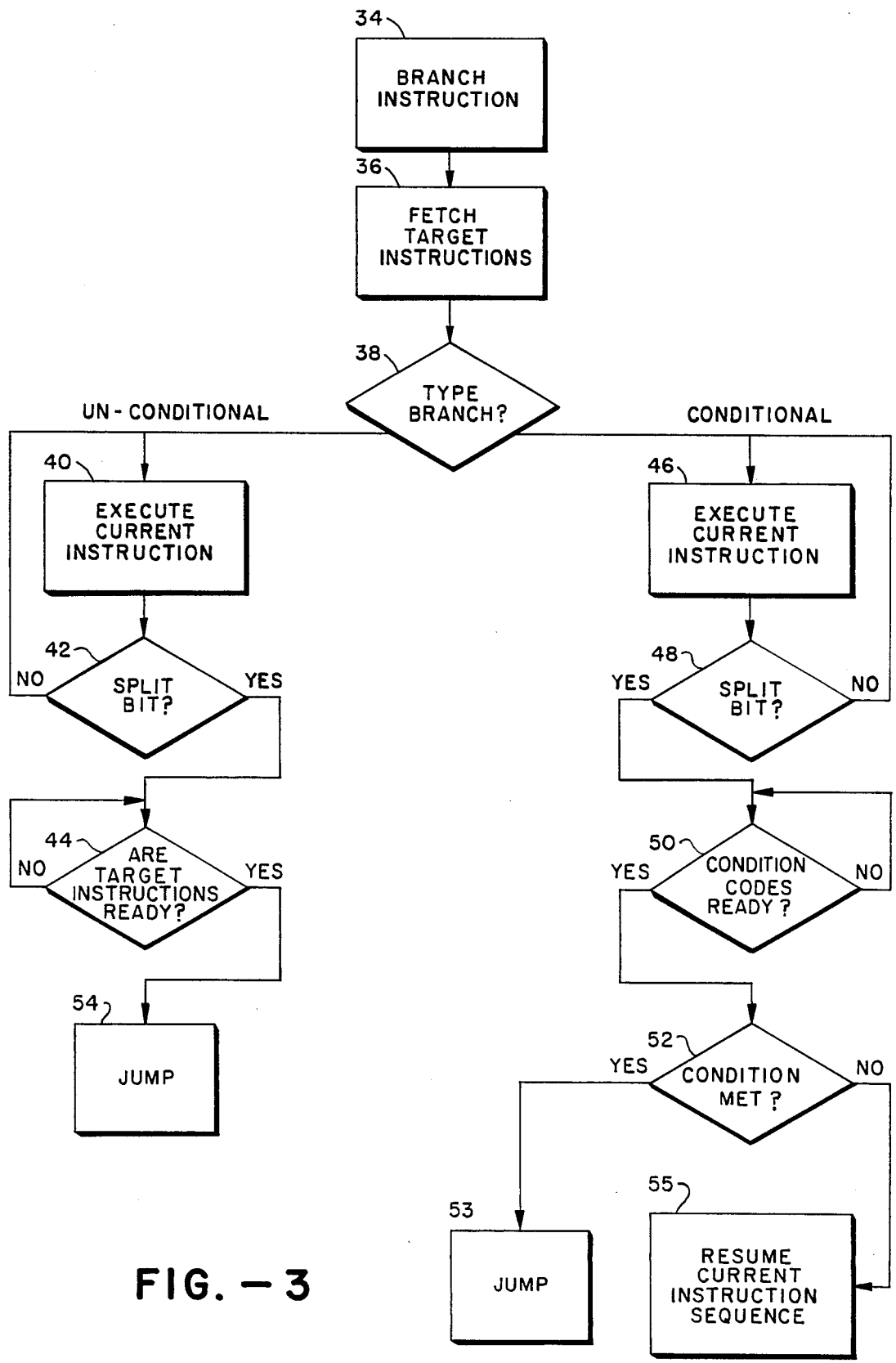
FIG. 3 is a flow diagram of the process of operation in the system of FIG. 1.

As indicated above, a detailed illustrative embodiment of the present invention is disclosed herein. However, specific operating formats, components and flow patterns in accordance with the present invention may be embodied in a wide variety of different forms, some of which may be quite distinct from those of the disclosed embodiment. Consequently, the specific structural and functional details disclosed herein are merely representative, yet in that regard they are deemed to afford the best embodiment for purposes of disclosure and to provide a basis for the claims herein which define the scope of the present invention.

Referring initially to FIG. 1, the system is illustrated with specific regard to the processing of programmed instructions. It is to be recognized that the system might be variously illustrated with a variety of functional components; however, for simplicity and ease of understanding, the disclosed arrangement is detailed primarily with regard to the structural elements related to the branch operations of the present development. Accommodating practical considerations, the disclosed embodiment is presented as a manageable teaching disclosure for one skilled in the art. Accordingly, a control system 10 (FIG. 1, upper right) represents any of various computer structures or arrangements as well known in the art including multiple processors or function units, memory and programmed control apparatus along with input/output facility. As well known, forms of such apparatus execute programmed instructions in a linked sequence and thereby accomplish a desired operation.

As disclosed herein, the system 10 drives an instruction pipeline 12 (FIG. 1, top central) through which instructions are supplied selectively to one of a pair of instruction buffers 14 and 16. That is, from the pipeline 12, instructions may be supplied either to the instruction buffer 14 or the instruction buffer 16.

Essentially, the buffers 14 and 16 comprise FIFO's (first-in-first-out registers) in which instructions are stacked for delivery in sequence to execution units 18. Ideally, an instruction is continually available for the execution units 18. As with the system 10, the execution units 18 may involve a variety of complex and extensive structure. However, various forms of such structures are well known and have been widely used in the past.

From the units 18 signal-represented processing results are supplied to the control system 10 through a channel 20, e.g. a data bus. The units 18 also include five detectors to provide five specific signals to the control system 10 in relation to branch operations. Specifically, from within the instruction execution units 18, a detector 19 senses branch commands to provide a branch signal in a line 20; a detector 21 senses a conditional branch to provide a representative signal in a line 22; a detector 23 senses the fulfillment of a condition to provide a condition-met signal in a line 24; a detector 25 senses a split bit to provide a split signal in a line 26 and a detector 27 senses that condition codes are ready to provide a code-ready signal in a line 28. These control signals are instrumental in branch operations of the system to effect delayed jumps from one sequence of program instructions to another with reduced loss of computing time.

The selection of instructions in sequence for the buffers 14 and 16 involves a pair of program counters 29 and 30 (lower right) along with a pair of instruction address registers 31 and 32 (upper right). In accordance with well known techniques, during periods of operation, the program counters 29 and 30 are incremented to specify sequences of instruction addresses for the registers 31 and 32 serving the instruction pipeline 12.

Essentially, at any given time, current operation involves supplying instructions in accordance with the operation of: one of the instruction buffers 14 or 16, one of the program counters 29 or 30 and one of the address registers 31 or 32. To illustrate operations, one of each of the pairs is designed "current" and the other is designed "target". Of course, the roles alternate with each jump; however, the drawing legends indicate one state.

On the occurrence of a branch command, the currently operating units continue to function, accordingly to save time while the target units are activated to accumulate a set of target instructions in the target instruction buffer. That is, on a branch command, there are still instructions to execute while the target or alternate buffer is being filled, specifically, instructions presently in the buffer and the pipeline. In accordance herewith, those instructions are executed as preparations proceed for a jump without a break in operating cycles. Thus, when a jump occurs, the target units are prepared and become the current units.

In FIG. 1, the buffer 14, the counter 29 and the register 31 are designated "current" and the buffer 16, the counter 30 and the register 32 are designated "target". However, on each jump, target functions switch to current functions. That is, with each jump, the current operation shifts between: the instruction buffers 14 and 16; the program counters 29 and 30; and the address registers 31 and 32. As a result of such shifts, the system accommodates jump operations that avoid breaks in the pipeline with attendant losses of time. The operating sequences and control functions attendant the shifts are treated in greater detail below. At this point, the branch command operations will be considered.

In the operation of the disclosed embodiment, branch commands may be either conditional or unconditional. In either case, after a variable interval, a branch command is followed by an instruction containing a split command indicating a time for execution. Following the appearance of an unconditional branch command in the execution units 18, the occurrence of an instruction word containing a split command prompts an immediate jump to the target program sequence.

In the case of a conditional branch command, the operation is somewhat more complex. If the condition imposed by a conditional branch has been met upon the occurrence of a split bit, the system jumps to the target program. Such operation is economical of time; however, a split bit also may occur before the condition codes are ready. In that case, the system waits until the condition codes are ready and a determination can be made whether or not the condition is met. If so, the system jumps. Alternatively, if a condition is not met, operation continues in the current program sequence. Accordingly, the current target buffer is flushed and is ready to be used on the occurrence of a subsequent branch instruction.

As explained above, in the operation of the system (for both conditional and unconditional branches) target instructions are accumulated for immediate use at the time of a jump. Relating the operation to FIG. 1, assume a sequence of current instructions is being processed through the buffer 14 when a branch command occurs. With the occurrence of such a command, target instructions are provided from the pipeline 12 to the instruction buffer 16. However, the current operation continues (executing current instructions) until a split bit occurs. Assuming a jump occurs, the system immediately shifts to the target instruction sequence and the instruction buffer 16 becomes the source of current instructions. Thus, the relationship of the buffers 14 and 16 to accommodate shifts from current instructions to target instructions enables effective branch operations economical of time. The program counters 29 and 30 along with the address registers 31 and 32 operate in similar alternative patterns.

In view of the above discussion, some consideration of the word format of instructions as used in the system of FIG. 1 is now appropriate. Of course, many forms are practical; however, as illustrated in FIG. 2, and as applicable to the present description, the initial eight bits (one through eight) constitute a field 33 utilized for branch commands and opcodes. Again, branch commands may be conditional or unconditional, and conditional branches are executed only if specified conditions are met.

The ninth bit of the instruction (FIG. 2) is consistently employed as the split bit 35. In the split bit 35, a binary "0" indicates no split and a binary "1" commands a split or jump operation.

Further with regard to the word format as illustrated in FIG. 2, the bits ten through fifteen (field 37) and sixteen through twenty-one (field 39) generally designate registers as for destinations, operands and so on. Various formats for such fields are well known. Of course, the word may include additional fields as suggested by the broken line 41 in FIG. 2.

The appearance of a branch command (unconditional) in the field 33 (FIG. 2) prompts the units 18 (specifically the detector 19) to provide a branch signal in the path 20 (FIG. 1). Similarly, a split bit "1" in the ninth bit (FIG. 2) prompts the units (specifically the detector 25) to produce a split signal in the path 26. In the case of an unconditional branch, these signals along with signals in the channel 20 prompt the control system 10 to: (a) initiate operations for accumulating target instructions and (b) accomplish jumps on command.

To consider a routine operation of the system (FIG. 1), assume the units designated "current" are providing a current sequence of instructions. In an exemplary cycle of operation, the program counter 29 is incremented to designate an address for the next instruction. The address is provided from the system 10 to the register 31 from which it is supplied to the pipeline 12. As a result, a current instruction is supplied to the buffer 14 for delivery in due course to the units 18 for execution.

Assume that such a cyclic routine is interrupted by the execution of an instruction word (FIG. 2) with an unconditional branch command in the field 33. The event is symbolized in the flow diagram of FIG. 3 by a block 34. Reference will now be made somewhat concurrently to FIGS. 1 and 3.

Relating the branch command to the operations of FIG. 1, prompted by the branch signal from the detector 19, the control system 10 sets the target program counter 30 in accordance with the branch to specify the target instruction address for placement in the target address register 32. The pipeline 12 then develops the target instruction in the target instruction buffer 16. The cycle is repeated and several instructions of the target sequence are set in the target instruction buffer 16. The operation of fetching target instructions is symbolized in FIG. 3 by a block 36.

If the assumed event had been a conditional branch command, the detector 19 would have prompted the same operation. That is, regardless of the type branch, the system fetches and accumulates target instructions, but proceeds to execute current instructions. The resolution of a branch command as being either "conditional" or "unconditional" is symbolized by a block 38 in FIG. 3. The continued execution of current instructions is indicated by the blocks 40 and 46.

As operations continue after a branch command, each execution is tested for a split bit, i.e. the presence of a "1" in the bit location 35 (FIG. 2). The split bit tests are represented for unconditional and conditional branches in FIG. 3 by the test blocks 42 and 48 respectively.

At this point, it is noteworthy that a split command (split bit "1") is prohibited in an instruction containing a branch command. Following a branch command, current instructions are processed in sequence until an instruction appears with a split command. It is the resulting delay that enables setting up the target instruction sequence for immediate operation on command.

If a branch is unconditional (FIG. 3, left), a split bit "1" prompts a jump when the target instructions are ready as indicated by the block 44 (FIG. 3). With the occurrence of a jump, the current sequential stream of instructions is switched from the buffer 14 (FIG. 1) to the buffer 16. Accordingly, the buffer 16 then carries current instructions and the buffer 14 stands ready to receive target instructions. In the next jump, the sequence of current instructions will shift from the buffer 16 back to the buffer 14. Similar shifts occur between the program counters 29 and 30 along with the address registers 31 and 32.

Returning to the consideration of an unconditional branch it is to be understood that in the preferred operation, a split bit is presented after a delay that sees the development of condition codes, resolution of the condition and useful processing. Such operating pattern is economical of time as it accommodates continuity in pipeline operation. However, the system is not confined to such patterns of operation. A split bit ("1") may occur before the condition codes are ready for a determination of whether the condition has been met. In any event, a jump is not initiated until a split bit has occurred (box 40, FIG. 3) and the condition codes are ready (box 50, FIG. 3). When both events have occurred, a test is made to determine if the condition has been met (box 52). On that determination, the system either jumps (box 53) or current operation is resumed without a pending branch (box 55).

Returning to the structure of FIG. 1, from the explained state in which the buffer 14 is supplying current instructions and the buffer 16 is ready with target instructions, the units 18 execute current instructions. The executions include: testing for a split bit "1", testing for the readiness of condition codes and testing as to whether the condition is met. The results of these tests are manifest by the signals in paths 24, 26 and 28. Specifically, if the condition codes are ready, a codes-ready signal appears in the path 28. If the condition is met, a signal is provided from the detector 23 through the condition-met path 26 to the system 10. A split bit prompts a signal in path 26.

If the condition has not been met when a split bit "1" occurs, the system continues with the current sequence, or is blocked until the condition codes are available and the condition can be tested. When a jump occurs from a conditional branch command, it involves shifts to the target operating units precisely as described above with reference to FIG. 1 in the case of an unconditional branch. If a conditional branch does not result in a jump (condition not met), the target units (instruction buffer 16, program counter 27, and address register 31) are cleared to await the occurrence of another branch command.

Recapitulating to some extent, the system of FIG. 1 has been described to involve three switched pairs of units that alternate functions executing current branch operations. Specifically, the structures are: the buffers 14 and 16; the program counters 29 and 30 and the address registers 31 and 32. The controls and signal paths involving the three structures are somewhat distinct and will now be considered in greater detail with reference to FIG. 4. Note that previously identified components of the system of FIG. 4 bear the same reference numerals as previously assigned. Also, in the system of FIG. 4, a single block 66 (upper left) represents the considerable computer facility including function units, master control, execution apparatus, memory and so on. As with respect to the previously described control system 10 and execution units 18, the block 66 can be variously fragmented and explained; however, with respect to the structure of the present invention, the system simply performs control functions which may be readily performed by any of a variety of computer systems as well known and widely used in the prior art.

To consider the operation of the system as illustrated in FIG. 4, assume a sequence of current instructions is in the process of execution. Specifically, assume instructions are being supplied from the pipeline 12 (extreme right) through a fetch control 68 to the instruction buffer 14. Also, assume that instructions are being passed from the buffer 14 through a multiplexer 70 to the block 66. In that regard, the multiplexer 70 is controlled by a unit 72 which is responsive to the control signals as described below to switch or shift operations on execution of a jump.

Further to the assumed state of operation, it will be understood that the program counter 29 (lower left) is active with its contents incremented cyclically by a unit 74 as supplied through a multiplexer 76 to the block 66. In the alternative, the multiplexer 76 may supply values from the program counter 30.

The counters 29 and 30 are controlled by a counter control 75 which is in turn controlled by the unit 66. Distinct from the control 75, the control unit 72 (central) controls a multiplexer 81 (lower right) for passing addresses from either the register 31 or the register 32 to the pipeline 12. Signal represented addresses are set in the registers 31 and 32 by an address source 83 (lower right) which is coupled to the control 66.

Pursuing the operations described above, assume that an executed instruction contains a branch command. Responsive to such command, the control 66 actuates the program counter control 75 to set the branch target number in the counter 30. Concurrently, the control 66 actuates the unit 72 switching the multiplexer 81 to cycle the number from the counter 30 through the increment unit 74 to the control 66.

Responsive to the control 66, the address source 83 (lower right) develops the target address setting it in the buffer register 30 from which it passes through the multiplexer 81 to the pipeline 12. As a consequence, a target instruction is supplied from the pipeline 12 through the fetch control 68 to the instruction buffer 16. The cycle is repeated advancing the program counter 30 with the result that a sequence of target instructions are developed in the buffer 16. As the target sequence of instructions is developed in the buffer 16, the instruction buffer 14 and the multiplexer 70 continue to provide instructions to the control 66 for execution.

With a series of target instructions stored in the buffer 16, the system continues to execute current instructions from the buffer 14 pending a split bit "1" as explained above. Thus, current instructions are processed until the time of a jump, which under optimum conditions enables actuating the processing of target instructions with no break in the pipeline operation.

Recapitulating, if the branch command is unconditional, the split bit specifies the time of a jump. Alternatively, if the branch command is conditional, the split bit "1" commands a jump only if the imposed conditions are met as determined within the control 66 (instruction execution units 18, FIG. 1). Otherwise, the branch is canceled with operating units cleared.

In the event of a jump, current operations shift: (a) from buffer 14 to buffer 16, (b) from counter 29 to counter 30, and (c) from register 31 to register 32. During the next jump, the reverse shifts will occur.

In view of the above description, it will be apparent that systems of the present invention afford effective and flexible operation for implementing branch operations with time economy. It also will be apparent that the system may be variously implemented depending on its application, the nature of the system 10 (FIG. 1), the function units or the control 66 and the unit 72 along with various other structural apparatus involved. Accordingly, the scope hereof should be determined in accordance with the claims as set forth below.

What is claimed is:

1. A process for a pipeline computer operation of branching from an existing sequence of instructions to a branch sequence of instructions under control of data in said existing sequence of instructions, the process including the steps of:

fetching instructions of said existing sequence and detecting a branch command in an instruction of the existing sequence to designate a branch instruction;

fetching said branch instruction to initiate a branch sequence of instructions;

executing instructions of said existing sequence of instructions to detect a split command in an instruction of the existing sequence indicating a time to branch; and branching from said existing sequence of instructions to said branch sequence of instructions under control of said split command to establish said branch sequence of instructions for execution as the existing sequence of instructions.

2. A process according to claim 1 wherein said split command comprises a single bit in an instruction.

3. A process according to claim 1 wherein said sequence of instructions are advanced by incrementing a program counter.

4. A process according to claim 1 wherein said instructions include encoded signals for execution comprising operand addresses and split bit for said split command.

5. A process according to claim 1 including further steps of setting a condition for a branch and testing for said condition to provide further signals for controlling said split.

6. A branch structure for use with a pipeline computer including an instruction source for providing sequences of instructions, certain of which instructions include branch commands or split commands, and means for executing said instructions of a sequence, said system comprising:

instruction storage means for receiving current and target sequences of instructions from said instruction source and supplying instructions identified as the current sequence to said means for executing said instructions;

means controlled by a branch command in an instruction to store a target sequence of instructions in said instruction storage; and means controlled by the occurrence of a split command in an instruction to shift said instruction storage from supplying said current sequence of instructions to supply said target sequence of instructions which target sequence of instructions accordingly is established as the current sequence of instructions.

7. A branch structure according to claim 6 wherein said instruction storage means further includes program counter means for tallying current and target program counts.

8. A branch structure according to claim 6 wherein said instruction storage means further includes program means for storing current and target addresses.

9. A branch structure according to claim 6 further including detection means operative with said means for executing instructions for detecting the occurrence of a branch command in an instruction.

10. A branch structure according to claim 6 further including detection means operative with said means for executing instructions for detecting the occurrence of a split bit in a command instruction.

11. A branch structure according to claim 6 further including detection means operative with said means for executing instructions for detecting the occurrence of a conditional branch command in an instruction and further including means for detecting the meeting of the specified condition.

12. A branch structure according to claim 11 further including detection means operative with said means for executing instructions for detecting the readiness of condition codes imposed by a branch command instruction.

13. A structure according to claim 6 wherein said instruction storage comprises a pair of first-in- first-out registers for alternately storing said current sequences of instructions.

14. A branch structure according to claim 6 wherein said instruction source takes the form of an instruction pipeline and said instruction storage means includes means for specifying addresses to said instruction pipeline.

15. A branch structure for use with a pipeline computer including an instruction source for providing sequences of instructions, certain of which instructions include branch commands or split commands, and means for executing said instructions of a sequence, said system comprising:

a first set of processor elements including a first instruction buffer, a first address register and a first program counter;

a second set of processor elements including a second instruction buffer, a second address register and a second program counter;

control means for advancing a current sequence of instructions by the operation of one of said first or second sets of processor elements;

branch means for detecting a branch command in said current sequence of instructions to specify a branch operation by setting a target sequence of instructions in said other of said first or second sets of processor elements;

split means for detecting a split command in said current sequence of instructions to specify implementing a previously detected branch command; and means to implement a branch from said current sequence of instructions to said target sequence of instructions under control of said branch means and said split means.

16. A branch structure according to claim 15 further including condition means for detecting that branch conditions have been met and wherein said means to implement a branch is further under control of said condition means.

* * * * *